United States Patent Office 2,786,848
Patented Mar. 26, 1957

2,786,848

PROCESS AND INTERMEDIATES IN THE PREPARATION OF HYDANTOIN

Harold Conroy, Plainfield, N. J., assignor to Merck & Co., Inc., Rahway, N. J., a corporation of New Jersey No Drawing. Application January 6, 1955,
Serial No. 480,291

12 Claims. (Cl. 260—309.5)

This invention relates to processes and intermediate compounds useful in the preparation of amino acids. More particularly, it is concerned with a new method of producing 5-(delta-aminobutyl) hydantoin, and with novel intermediate compounds useful in preparing this product.

The compound, 5-(delta-aminobutyl) hydantoin can be hydrolyzed by methods known in the art to produce the essential amino acid lysine. Lysine, alpha, epsilon-diamino caproic acid, cannot be synthesized, at least in adequate amounts by animals, and must be obtained from external sources. Accordingly, this essential amino acid is of major commercial importance.

One of the objects of this invention is to provide new processes and intermediates useful in the preparation of lysine. Another object is to provide a new process for the preparation of 5-(delta-aminobutyl) hydantoin. A further object is to provide new intermediate products useful in the production of 5-(delta-aminobutyl) hydantoin. These and other objects of my invention will be readily apparent from the detailed description hereinafter provided.

In accordance with one embodiment of my invention, lysine is obtained by hydrogenating 5-(2-furyl) hydantoin to obtain 5-(tetrahydro-2-furyl) hydantoin, reacting said tetrahydrofuryl hydantoin with a hydrohalic acid having a molecular weight in excess of 35 to produce 5-(delta-halobutylidene) hydantoin, reacting said halo hydantoin with ammonia to obtain 5-(delta-aminobutylidene) hydantoin; hydrogenating said amino hydantoin in the presence of a catalyst to produce 5-(delta-aminobutyl) hydantoin; and hydrolyzing said aminobutyl hydantoin by reaction with an aqueous mineral acid or an aqueous inorganic aqueous base at elevated temperatures to obtain dl-lysine which is conveniently isolated in the form of its acid salt. These reactions may be shown as follows:

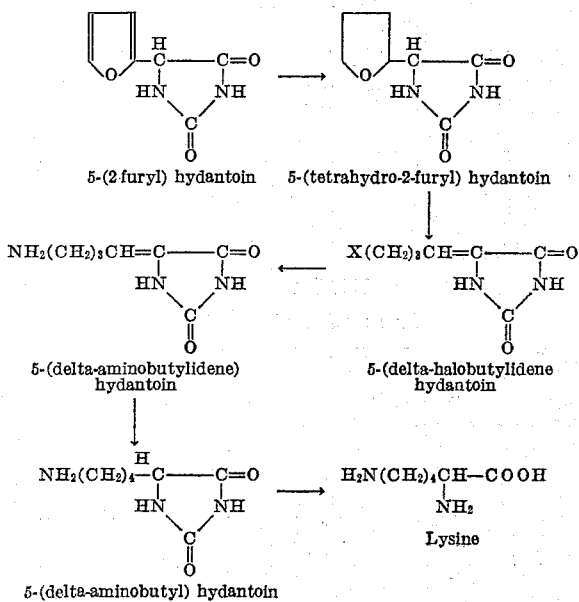

wherein X represents a halogen having a molecular weight in excess of 35. The starting material, 5-(2-furyl) hydantoin, is prepared from furfural which is an inexpensive and readily available starting material. The conversion of furfural to its hydantoin has been described in J. Org. Chem., volume 9, page 21 (1944).

In carrying out the first step of my process, the 5-(2-furyl) hydantoin is intimately contacted with hydrogen in a neutral or acidic medium in the presence of a hydrogenation catalyst until two moles of hydrogen are absorbed and the corresponding tetrahydro furyl hydantoin compound is formed. Any of the various hydrogenation catalysts such as the noble metals, the noble metal oxides, Raney nickel, copper chromite, and the like can be utilized in carrying out this hydrogenation. However, I usually prefer to employ palladium on charcoal as the catalyst since this usually results in the production of enhanced yields of the desired product. Although other solvents for 5-(2-furyl) hydantoin can be used as the reaction medium, the reaction is most conveniently carried out in water, lower aliphatic alcohols or aqueous-lower aliphatic alcohol mixtures. The reaction can be carried out at temperatures ranging from about room temperature to about 130° C., but, I prefer to carry out this step at a temperature of about 50 to 100° C., since at these temperatures the reaction is rapid and the reaction product contains a minimum amount of by-products. The reduction can be effected at either atmospheric pressure or superatmospheric pressure, although I usually find it most convenient to employ a moderate pressure of about 10–50 p. s. i. g.; since under these conditions the reaction is rapid and the need for using expensive, high-pressure equipment is avoided.

The 5-(tetrahydro-2-furyl) hydantoin produced by this hydrogenation is readily recovered from the resulting hydrogenation mixture by removing the catalyst and evaporating the resulting solution to dryness under reduced pressure. The product so obtained can be further purified, if desired, by recrystallization from suitable solvents. However, usually I find that such further purification is unnecessary and the product obtained by the evaporation of the hydrogenation mixture can be utilized directly in the next step of my process.

The reduction product, 5-(tetrahydro-2-furyl) hydantoin, formed in this step contains two asymmetric carbon atoms and more than one stereoisomer is formed in the reduction. One of these stereoisomers has been isolated in pure form from the product of the reduction. However, in carrying out the further steps of my process, it is not necessary to separate these stereoisomeric forms, and as indicated above, the residue obtained from the reduction can be employed directly in the next step of my process.

In the second step of my process, the tetrahydrofuryl hydantoin is reacted with a hydrohalic acid having a molecular weight in excess of 35 to produce 5-(delta-halo-butylidene) hydantoin. In effecting this reaction, the tetrahydrofuryl hydantoin is intimately contacted with the hydrohalic acid preferably at elevated temperatures to obtain the desired halo compound. In general, I find that it is necessary to carry out the reaction at a temperature in excess of about 50° C. since at lower temperatures a large amount of undesired products are obtained. Although temperatures higher than about 150° C. can be used, I find that it is preferable to conduct the reaction at a temperature within a range of about 50–150° C. Thus, in carrying out the reaction with hydrobromic acid it is conveniently effected by dissolving the tetrahydrofuryl hydantoin in concentrated hydrobromic acid and heating the resulting reaction mixture to about 100° C. for three hours while passing in a stream of gaseous hydrogen bromide. The reaction is also conveniently carried out by passing HCl into the molten tetrahydrofuryl hydantoin at a temperature of about 110° C. for sufficient time to form the desired chlorobutylidene compound.

Alternatively, if desired, an amine catalyst can also be utilized in carrying out this step of my process. Examples of suitable catalysts that might be mentioned are pyridine, dimethyl aniline, methyl amine, dimethyl amine, and the like. Although larger or smaller amounts of the catalysts may be used, I find that an amount equivalent to between about 10% and 15% by weight of the tetrahydrofuryl hydantoin can be conveniently employed. Thus, the reaction can be effected by heating a solution of the tetrahydrofuryl hydantoin in pyridine at about 130° C. for two hours while passing in a stream of hydrogen chloride gas.

The step of converting the halobutylidene hydantoin to the corresponding aminobutylidene compound is readily effected by reaction of the halo compound with ammonia. Ordinarily, I prefer to carry out this conversion by reacting the halo compound with ammonium hydroxide at room temperature for sufficient time to effect the desired amination. Alternatively, the amino compound can be readily prepared by reacting the halobutylidene hydantoin with liquid ammonia and effecting the amination under superatmospheric pressure.

In the next step of my process, the amino hydantoin is reacted with hydrogen in the presence of a hydrogenation catalyst to produce the corresponding aminobutyl compound. Any of the usual hydrogenation catalysts such as the noble metals, noble metal oxides, Raney nickel, copper chromite, and the like may be utilized in carrying out this step of my process. Thus, the reduction is conveniently effected by hydrogenating 5-(delta-aminobutylidene) hydantoin in water in the presence of platinum oxide. The hydrogenation can be carried out at atmospheric pressure or at super-atmospheric pressures until the desired 1 mole of hydrogen has been consumed.

In the final step of my process the 5-(delta-aminobutyl) hydantoin is hydrolyzed by heating with a mineral acid or an inorganic base such as a metal hydroxide or ammonium hydroxide to obtain dl-lysine. For example, the hydrolysis of the hydantoin group can be readily effected by heating the compound with hydrochloric acid at 150° C. under pressure for 17 hours. From the resulting reaction, the dl-lysine is recovered in the form of its hydrochloride salt.

The following examples illustrate the processes of my invention.

EXAMPLE 1

*Preparation of 5-(tetrahydro-2-furyl) hydantoin*

A solution of 300 g. of 5-(2-furyl) hydantoin in 1500 cc. of hot water containing 10 g. of 10% palladium on charcoal was hydrogenated at 1000 lbs./sq. in. hydrogen pressure at 100° C. Absorption of hydrogen was rapid and the theoretical quantity was approached within two hours. After removal of the catalyst, the solution was concentrated under reduced pressure and the thick syrup was taken up in 600 cc. of ethanol, when one of the isomers, M. P. 185–188° C. crystallized. Further crystallization from ethanol raised the M. P. to 191–2° C. The second stereoisomer M. P. 114–127° C. was obtained from the mother liquor, but repeated recrystallization from ethanol-methanol failed to sharpen the M. P.

EXAMPLE 2

*Preparation of 5-(tetrahydro-2-furyl) hydantoin*

Twenty grams (0.1085 M) of recrystallized 5-(2-furyl) hydantoin monohydrate in 200 ml. of water was hydrogenated at 80° C. in the presence of 1.3 grams of 5% palladium in charcoal at an initial hydrogen pressure of 30 p. s. i. g. The batch consumed 0.229 M of hydrogen in two or three hours. After cooling to room temperature, the mixture was filtered. The resulting filtrate was evaporated under reduced pressure to obtain 5-(tetrahydro-2-furyl) hydantoin.

EXAMPLE 3

*Preparation of 5-(delta-bromobutylidene)-hydantoin*

5-(2-furyl)-hydantoin (100 g.) was hydrogenated in two equal batches with 300 cc. methanol and 5.0 g. 10% Pd-C for each batch. Batch I consumed about 19 lbs. in 45 min.; batch II took up about 18 lbs. in 40 minutes. The theoretical pressure drop was 21.7 lbs.

The catalyst was filtered off, and the clear colorless combined solution evaporated to dryness in vacuo. The semisolid white residue of 5-(tetrahydro-2-furyl) hydantoin (II) was taken up in 100 cc. of concentrated hydrobromic acid and heated to 100° C. on the steam bath while gaseous hydrogen bromide was passed through the mixture for three hours. The dark brown clear syrup was evaporated in vacuo and ice water added to the resulting residue. The sticky tan solid which was obtained by removing the water weighed 118 g., M. P. 125–140° C. This was recrystallized from aqueous ethanol and washed with ether. First crop 35 g. leaflets M. P. 161° C.; second crop 10 g., M. P. 158–160° C. Calcd. for $C_7H_9N_2O_2Br$: C, 36.07; H, 3.89; Br. 34.29. Found: C, 35.52; H, 3.62; Br, 36.51.

EXAMPLE 4

*Preparation of 5-(delta-aminobutylidene) hydantoin hydrobromide*

About 17 grams of 5-(delta-bromobutylidene) hydantoin, was dissolved in 350 cc. conc. ammonium hydroxide. The clear, slightly yellowish solution was allowed to stand at 25° C. for about 19 hours, and then was evaporated on the steam bath under reduced pressure. The thick syrup was taken up in ethanol, which was removed and the process repeated several times to remove ammonia. Ten cc. of water was added to the residue and the solution was acidified to pH 2 with hydrobromic acid. Ethanol (150 cc.) was added and crystallization was allowed to proceed at room temperature, and later in the refrigerator. About 16 g. of solid (M. P. 220–30° C.) was obtained from the various crops. From this by repeated recrystallization a sample, M. P. 243.5–244.5° C. was obtained which gave satisfactory analytical figures. Calcd. for $C_7H_{12}N_3O_2Br$: C, 33.61; H, 4.84; N, 16.80. Found: C, 33.81; N, 5.01; N, 16.58.

EXAMPLE 5

*Preparation of 5-(delta-aminobutyl)-hydantoin hydrobromide*

5 - (delta - aminobutylidene) hydantoin hydrobromide (1.69 g.) in 20 cc. of water, was hydrogenated at room temperature with 0.1 g. of platinum oxide catalyst at about 5–10 p. s. i. g. The hydrogen uptake was close to theoretical. The solution was filtered and evaporated to dryness under reduced pressure. The resulting solid was flushed twice with ethanol and the solid collected weighed 1.37 g. (81%). A sample recrystallized from aqueous ethanol had M. P. 197–198.5° C.

EXAMPLE 6

*Preparation of dl-lysine*

One gram of 5-(delta-aminobutyl) hydantoin hydrobromide was heated in a sealed tube with 10 cc. of concentrated HCl at 150° C. for 17 hours. The straw colored liquid was evaporated to dryness under reduced pressure. The residue was taken up in 20 cc. of absolute ethanol and the precipitate of ammonium chloride was removed. The addition of 20 cc. of ether precipitated the dl-lysine dihydrochloride as an oil which rapidly crystallized. The crude material was dissolved in water along with an excess of picric acid. The pH was adjusted to 8 by the addition of dilute sodium carbonate. On cooling, the monopicrate crystallized in yellow needles (dec. 230–40° C. to a black solid). The literature reports dec. 230° C.

The monopicrate (395 mg.) and picric acid (229 mg.) were recrystallized together from hot water to get the dipicrate. Air dried material had M. P. ca. 83° C. (rapid heating) with resolidification at 120–130° C., remelting at ca. 190°. This, after one more crystallization from hot water, followed by vacuum drying at 100° C. had M. P. 188° C. Mixed M. P. with authentic dl-lysine dipicrate (M. P. 188° C.) was 188° C.

EXAMPLE 7

*Preparation of 5-(delta-chlorobutylidene) hydantoin*

8.6 g. of 5-(tetrahydro-2-furyl) hydantoin (M. P. 118–155° C.) and 5 cc. of pyridine heated at 130° C. for 2 hours with stirring while a slow steady stream of hydrogen chloride gas was passed into the mixture. The light brown syrup was dissolved in 100 cc. of hot water and crystallization allowed to proceed. The crude, slightly yellow, slightly sticky product weighed 8.97 g. (95%). Recrystallization from 80 cc. of 10% ethanol-90% water mixture gave 7.40 g., M. P. 147–148° C. (78%).

EXAMPLE 8

*Preparation of 5-(delta-chlorobutylidene) hydantoin*

The colorless semi-crystalline residue of 5-(2-tetrahydrofuryl) hydantoin (obtained by hydrogenation of 50.0 gms. of 5-(2-furyl) hydantoin monohydrate) was heated to 110° C., at which temperature it became molten. Hydrogen chloride gas was passed into the melt at 110° C. for eight hours, with good agitation. The batch gradually became dark red in color during the course of the reaction. At the end of the reaction the batch had crystallized almost completely.

To the batch was added a mixture of 250 ml. of water and 50 ml. of ethanol. Heating to 80–90° C. gave a clear red solution, which was cooled to 0–5° in an ice bath. The product oiled out at first, and then crystallized. After aging at 0–5° for one hour, the mixture was filtered, the cake washed with cold water and dried. The yield of crude product was 46.5 gms. (93% of theory).

Pure material was obtained by recrystallizing 60 gms. of the crude material four times from a mixture of 600 ml. of water and 60 ml. of ethanol 2B, each time treating the solution with 10 gms. of Darco G–60. In this manner there was obtained 12.0 gms. (20% recovery) of white, analytically pure material, M. P. 150.8–153.0° C.; λ max 220 $E\%=457$, λ max 2710 $E\%=654$.

Various changes and modifications may be made in carrying out the present invention without departing from the spirit and scope thereof. Insofar as these changes and modifications are within the scope of the appended claims, they are to be considered as part of this invention.

I claim:

1. The process which comprises reacting 5-(2-furyl) hydantoin with hydrogen at a pH not in excess of about 7.0 in the presence of a hydrogenation catalyst until an amount of hydrogen not in excess of about two moles per mole of hydantoin is absorbed to obtain 5-(tetrahydro-2-furyl) hydantoin; treating said tetrahydrofuryl-hydantoin with a hydrohalic acid having a molecular weight in excess of 35 to produce 5-(delta-halobutylidene) hydantoin; reacting said halobutylidene hydantoin with ammonia to obtain 5-(delta-aminobutylidene) hydantoin; and intimately contacting said aminobutylidene hydantoin with hydrogen in the presence of a hydrogenation catalyst to produce 5-(delta-aminobutyl) hydantoin.

2. The process which comprises intimately contacting 5-(2-furyl) hydantoin with hydrogen at a pH not in excess of about 7.0 in the presence of a hydrogenation catalyst until an amount of hydrogen not in excess of about two moles per mole of hydantoin is absorbed to obtain 5-(tetrahydro-2-furyl) hydantoin; reacting said tetrahydro furyl hydantoin with hydrobromic acid to produce 5-(delta-bromobutylidene) hydantoin; treating said bromobutylidene hydantoin with ammonium hydroxide to obtain 5-(delta-aminobutylidene) hydantoin; and hydrogenating said aminobutylidene hydantoin in the presence of a hydrogenation catalyst to produce 5-(delta-aminobutyl) hydantoin.

3. The process which comprises intimately contacting 5-(2-furyl) hydantoin with hydogen at a pH not in excess of about 7.0 in the presence of a hydogenation catalyst until an amount of hydrogen not in excess of two moles per mole of hydantoin is absorbed to obtain 5-(tetrahydro-2-furyl) hydantoin; reacting said tetrahydrofuryl hydantoin with hydrogen chloride to produce 5-(delta-chlorobutylidene) hydantoin; treating said bromobutylidene hydantoin with ammonium hydroxide to obtain 5-(delta-aminobutylidene) hydantoin; and hydrogenating said aminobutylidene hydantoin in the presence of a hydrogenation catalyst to produce 5-(delta-aminobutyl) hydantoin.

4. The process for the production of 5-(tetrahydro-2-furyl) hydantoin which comprises intimately contacting 5-(2-furyl) hydantoin with hydrogen at a pH not in excess of about 7.0 in the presence of a hydrogenation catalyst until an amount of hydrogen not in excess of about two moles per mole of hydantoin is absorbed.

5. The process for the production of 5-(tetrahydro-2-furyl) hydantoin which comprises intimately contacting 5-(2-furyl) hydantoin with hydrogen at a pH not in excess of about 7.0 in the presence of a noble metal catalyst until an amount of hydrogen not in excess of about two moles per mole of hydantoin is absorbed.

6. The process for the production of 5-(tetrahydro-2-furyl) hydantoin which comprises intimately contacting 5-(2-furyl) hydantoin with hydrogen at a pH not in excess of about 7.0 in the presence of palladium catalyst until an amount of hydrogen not in excess of about two moles per mole of hydantoin is absorbed.

7. The process for the production of 5-(delta-halobutylidene) hydantoin which comprises reacting 5-(tetrahydro-2-furyl) hydantoin with a hydrohalic acid having a molecular weight in excess of 35 at a temperature in excess of about 50° C.

8. The process for the preparation of 5-(deltabromobutylidene) hydantoin which comprises reacting 5-(tetrahydro-2-furyl) hydantoin with hydrobromic acid at a temperature in excess of about 50° C.

9. The process for the preparation of 5-(delta-chlorobutylidene) hydantoin which comprises reacting 5-(tetrahydro-2-furyl) hydantoin with hydrochloric acid at a temperature in excess of about 50° C.

10. 5-(delta-chlorobutylidene) hydantoin.
11. 5-(delta-bromobutylidene) hydantoin.
12. 5-(delta-aminobutylidene) hydantoin.

References Cited in the file of this patent

UNITED STATES PATENTS

| | | |
|---|---|---|
| 2,498,300 | Scott | Feb. 21, 1950 |
| 2,557,904 | Britton et al. | June 19, 1951 |
| 2,564,647 | Rogers | Aug. 14, 1951 |
| 2,564,649 | Rogers | Aug. 14, 1951 |
| 2,728,777 | Coffman et al. | Dec. 27, 1955 |